United States Patent [19]

D'Alterio et al.

[11] Patent Number: 4,752,491

[45] Date of Patent: Jun. 21, 1988

[54] COOKING SUPERIMPOSED PASTA RIBBONS ON A ZIGZAG CONVEYOR

[75] Inventors: Joseph C. D'Alterio, 64 Sugar Maple La., Glen Cove, N.Y. 11542; Israelis Reznikas, Kew Gardens, N.Y.

[73] Assignee: Joseph C. D'Alterio, Glen Cove, N.Y.

[21] Appl. No.: 785,965

[22] Filed: Oct. 10, 1985

[51] Int. Cl.⁴ .............................................. A23L 1/16
[52] U.S. Cl. ..................... 426/523; 426/451; 426/497
[58] Field of Search ............ 426/557, 451, 496, 497, 426/517, 518, 520, 523

[56] References Cited

U.S. PATENT DOCUMENTS

| | | | |
|---|---|---|---|
| 4,098,906 | 7/1978 | Hesaki et al. | 426/451 |
| 4,271,205 | 6/1981 | Kaneko | 426/451 |
| 4,522,217 | 6/1985 | D'Alterio | 134/25.3 |
| 4,569,849 | 2/1986 | Codino | 426/496 |

FOREIGN PATENT DOCUMENTS 2112622  7/1983  United Kingdom ............... 426/557

Primary Examiner—Raymond N. Jones
Assistant Examiner—Carolyn Paden
Attorney, Agent, or Firm—Paul W. Garbo

[57] ABSTRACT

In continuously cooking fresh pasta in ribbon form by transportation on a zigzag conveyor immersed in a cooking water bath, it has been found that two or more superimposed ribbons of pasta can be simultaneously cooked by transportation on the zigzag conveyor without the pasta ribbons sticking together if the pasta ribbons are separately exposed to steam or hot water for a brief period before the pasta ribbons are brought together in superimposed relation. By this simple pretreatment of each pasta ribbon, the cooking capacity of the conveyor is at least doubled.

7 Claims, 1 Drawing Sheet

COOKING SUPERIMPOSED PASTA RIBBONS ON A ZIGZAG CONVEYOR

BACKGROUND OF THE INVENTION

This invention relates to the cooking of ribbons of pasta carried through a tank of hot water by a conveyor system having a zigzag travel path therethrough. More particularly, the invention makes it possible to convey two or more pasta ribbons in superimposed relation through the hot water without the pasta ribbons sticking together.

The commercial cooking of fresh pasta products often involves a conveyor system which carries the pasta product through a tank of hot or boiling water along a submerged zigzag travel path. Two types of such conveyor systems have been developed.

One type involves a stack of closely spaced, parallel conveyors wherein the top run of the continuous belts of adjacent conveyors travel in opposite directions. Such a conveyor system is shown in FIG. 1 of U.S. Pat. No. 2,905,105 to Lombi.

The other type of conveyor system utilizes a pair of continuous belts which are held with a uniform spacing between them during their zigzag travel through the hot water. An improved form of such a conveyor system is disclosed and claimed in U.S. Pat. No. 4,522,217 to D'Alterio.

A principal object of this invention is to increase the production capacity of zigzag conveyors used in cooking pasta products.

Another important object is to achieve the increased production capacity with relatively small equipment additions.

Other features and advantages of the invention will be apparent from the description which follows.

SUMMARY OF THE INVENTION

Sheets or ribbons of fresh pasta dough when laid on top of one another and carried by a conveyor into a cooking bath of hot water stick together. Hence, heretofore it has been common practice to convey a single sheet or ribbon of fresh pasta dough through a cooking water bath. It has now been found that a sheet of pasta dough loses its stickiness after it has been immersed in hot water or contacted with steam for a relatively short time.

In accordance with this invention, two or more sheets or ribbons of fresh pasta dough can be cooked on top of one another without sticking together while on a conveyor which carries the overlaid pasta ribbons through a cooking bath along a zigzag travel path, after the pasta ribbons have first been separately exposed to hot water at a temperature of at least 180° F. or saturated steam for a short period less than a minute. In most cases, this pretreatment of the separated pasta ribbons requires only about 15 to 30 seconds. Another guide to this pretreatment of the separated pasta ribbons is to make its duration not more than 10% of the total desired cooking time; usually the pretreatment is only about 5 to 7% of the total cooking period.

BRIEF DESCRIPTION OF THE DRAWINGS

For a better understanding of the invention, the further description thereof will refer to the accompanying drawings of which.

DESCRIPTION OF PREFERRED EMBODIMENTS

Figure 1:
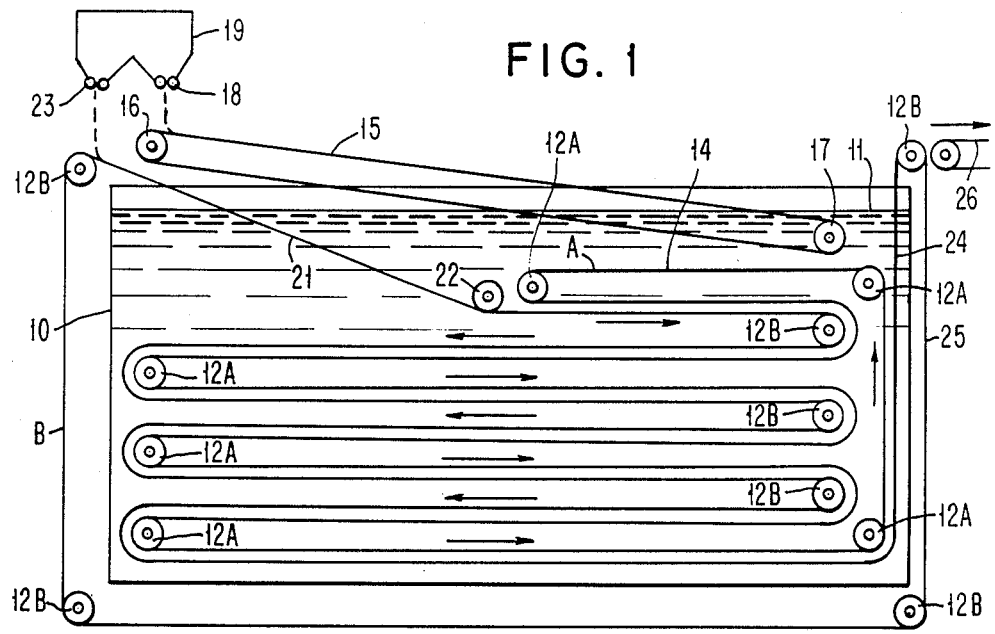
FIG. 1 is a diagrammatic side elevation of one preferred embodiment of the invention.

FIG. 1 shows diagrammatically the zigzag conveyor of FIG. 1 of U.S. Pat. No. 4,522,217 which has been modified in accordance with this invention principally by the addition of a small continuous conveyor to transport one ribbon of fresh pasta to the end of the cooking water bath opposite the end where another fresh pasta ribbon enters the cooking bath.

The pasta cooking system of FIG. 1 comprises cooking tank 10 filled with water to level 11, and a pair of continuous conveyor belts A, B which have a zigzag travel path within tank 10. The details of belts A, B, their respective drive sprockets 12A, 12B, and the straight guides and arcked guides (not shown) to maintain belts A, B uniformly spaced during their zigzag travel within tank 10 have been fully described in U.S. Pat. 4,522,217 and need not be repeated here.

Comparing FIG. 1 with FIG. 1 of U.S. Pat. No. 4,522,217, it will be seen that topmost run 14 of belt A is submerged in the water bath of this invention.

Straight continuous conveyor belt 15 is disposed above tank 10 and extends from roller 16 to roller 17. Either or both rollers 16, 17 are mechanically driven to transport a ribbon of fresh pasta dropping down on belt 15 from rollers 18 of pasta-making machine 19. The pasta ribbon carried by belt 15 falls on topmost run 14 of belt A where belt 15 goes around roller 17.

Topmost run 21 of belt B extends slantwise from the top edge of tank 10 to marginal sprockets 22 to carry a pasta ribbon dropping on run 21 from rollers 23 of pasta machine 19. Thus, one pasta ribbon enters the cooking bath near one end thereof while the other pasta ribbon enters the cooking bath near the opposite end thereof. The two pasta ribbons individually exposed to the cooking bath come together at approximately midway between the ends of the bath. The pasta ribbon carried by run 14 of belt A falls on the other pasta ribbon carried by run 21 of belt B near the midpoint in the length of tank 10.

The two superimposed pasta ribbons become captured between the uniformly spaced runs of belts A, B and are thus carried along the zigzag path until the cooked pasta ribbons are discharged from tank 10 where vertical run 24 of belt B emerges from tank 10. The arrows in FIG. 1 indicate the movement of the superimposed pasta ribbons through cooking tank 10. Adjacent sprocket 12B where upward-moving run 24 of belt B becomes downward-moving run 25 is shown part of a conveyor 26 used to take the two cooked pasta ribbons to any desired further processing and packaging stations.

Because the two fresh pasta ribbons were separately cooked to a slight extend before they were laid on one another for the predominent amount of cooking accomplished in tank 10, the cooked pasta ribbons reaching conveyor belt 26 are not stuck together so that tomato sauce and grated cheese may be easily spread between the cooked ribbons if desired.

Generally, the fresh pasta ribbons are separately immersed in the cooking water bath at a temperature of at least about 180° F. for about 5 to 10% of the total cooking time. The total cooking time for any pasta, as is well known, depends on its composition (e.g., spinach pasta or egg noodles), its thickness and the desired "al dente" consistency of the cooked pasta. As an illustration, where the pasta ribbons require a total cooking time of 6 minutes, only 22 seconds or 6% of the total cooking time is sufficient to achieve preliminary separate cooking of the ribbons so that they will not stick together during the remaining 5 minutes and 38 seconds of cooking time during which the two ribbons are in contact with one another.

The speed of conveyor 15 is coordinated with the speed of belts A, B so that the pasta ribbon carried on belt 15 is fed at the same rate of the pasta ribbon carried by run 21 of belt B. Preferably, the coordination is accomplished by driving one roller of conveyor 15, say roller 16, by means of a power sprocket or gear mounted on the shaft of roller 16 which is connected by a power chain or other known power train to the drive system of sprockets 12A, 12B.

Figure 2:
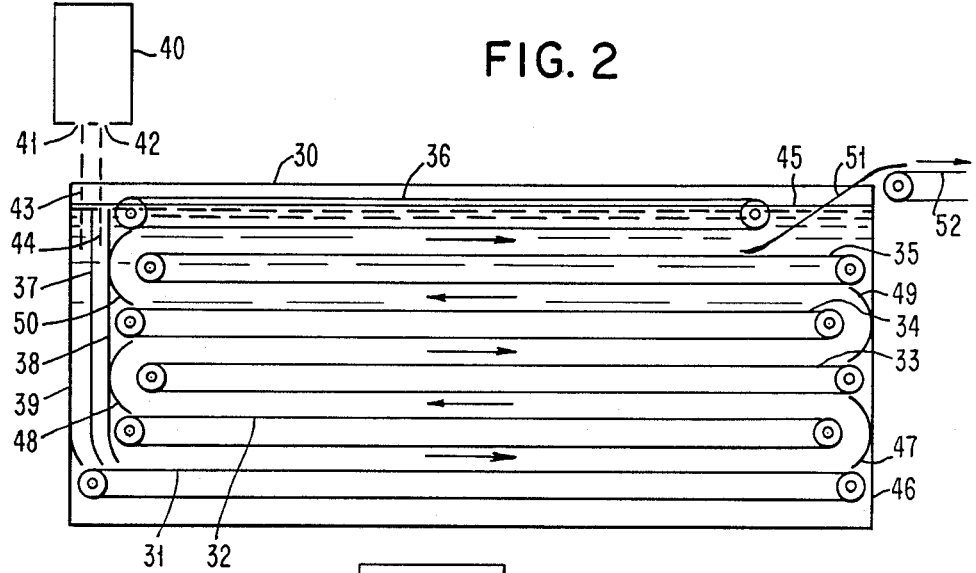
FIG. 2 is a similar side elevation of another preferred embodiment of the invention.

FIG. 2 shows diagrammatically a pasta cooking system differing from cooking vessel 12 and conveyor 13 of FIG. 1 in U.S. Pat. No. 2,905,105 essentially only in that a baffle divides the supply chute into two separate passages for two ribbons of fresh pasta.

Cooking tank 30 of FIG. 2 holds six individual continuous conveyor belts 31, 32, 33, 34, 35, 36 and has two vertical walls or baffles 37, 38 parallel to, and spaced from, end wall 39 of tank 30. Pasta-making machine 40 discharges two separate pasta ribbons through openings 41, 42 directly into passages 43, 43 formed between baffle 37 and end wall 39 and between baffles 37, 38.

Tank 30 is filled with boiling water to level 45 so that the separate pasta ribbons dropping down through passages 43, 44 are exposed to the boiling water and thus are pretreated in accordance with this invention. The pretreated pasta ribbons come together on, and are carried by, conveyor 31 toward end wall 46 of tank 30. The two pasta ribbons are held in superimposed relation between the upper run of belt 31 and the lower run of belt 32. The two pasta ribbons are deflected by arcked babble 47 and become captured between belts 32, 33. The two pasta ribbons continue together past arcked baffle 48, between belts 33, 34, past baffle 49, between belts 34, 35, past baffle 50, between belts 35, 36 and over discharge baffle 51 where the cooked pasta ribbons are carried away by conveyor 52 shown only partially. The arrows in FIG. 2 show the travel path of the superimposed pasta ribbons through cooking tank 30. Because of the preliminary short cooking of the separate pasta ribbons in passages 43, 44 within the boiling water in tank 30, the cooked pasta ribbons may be readily separated from one another without any indication of sticking together.

Figure 3:
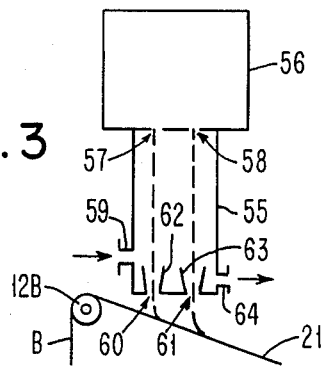
FIG. 3 is a diagrammatic side elevation of a steam chamber through which two separate ribbons of fresh pasta pass before both ribbons are deposited on belt run 21 of FIG. 1 (in which case conveyor belt 15 is eliminated).

FIG. 3 shows steam chamber 55 attached to the discharge end of pasta-making machine 56. One pasta ribbon issues from slot 57 and a second pasta ribbon issues from slot 58. Saturated steam is injected into chamber 55 through inlet 59. Thus, the two ribbons of fresh pasta descend separately through chamber 55 completely bathed in steam to achieve the anti-sticking preliminary treatment of this invention. Slots 60, 61 in the bottom of chamber 55 have internal lips 62, 63 respectively, so that steam condensing in chamber 55 and running down the walls thereof collects as a shallow pool in the bottom of chamber 55. Condensate is drained from chamber 55 through outlet 64. A valved pipe (not shown) connected to outlet 64 is used to control the drainage of condensed steam from chamber 55.

The steam-pretreated pasta ribbons issue from slots 60, 61 in the bottom of chamber 55. The pasta ribbon exiting from slot 60 falls on slanted run 21 of belt B of the conveyor system shown in FIG. 1. The other pasta ribbon exiting from slot 61 falls on top of the pasta ribbon from slot 60 already laid on belt run 21. The superimposed pasta ribbons are carried by belt run 21 into the cooking water bath of FIG. 1. The two pasta ribbons captured between conveyor belts A, B follow the zigzag path thereof and are discharged in the desired cooked condition. Because of the brief steam pretreatment in chamber 55, the cooked pasta ribbons are not stuck together. The steam pretreatment is effected in less than 10% of the total cooking time. As already mentioned, the use of steam chamber 55 eliminates the need to have conveyor belt 15 and to separately immerse the two pasta ribbons in the cooking water bath before the pasta ribbons are brought together by belts A, B of the cooking system shown in FIG. 1.

It is therefore clear that for relatively small and inexpensive additions to, or modifications of, the pasta cooking systems of the types shown in U.S. Pat. Nos. 4,522,217 and 2,905,105, the pasta cooking capacity of such systems is easily doubled. Skilled workers in the art will readily visualize tripling the cooking capacity, for example, by having three separate pasta ribbons descend through steam chamber 55 of FIG. 3 before they are laid on one another on belt run 21. Obviously, substantial savings in capital investment and operating expense are achieved by this invention.

Variations of the invention illustrated by FIGS. 1, 2 and 3 will be apparent to those skilled in the art. For instance, the pasta cooking system of FIG. 1 may have conveyor belt 15 removed therefrom and in lieu of pasta-making machine 19 which produces two pasta ribbons, two machines each producing a single pasta ribbon may be used; one machine is positioned like machine 19 of FIG. 1 to deposit a pasta ribbon on run 21 of belt B and the other machine is positioned near the vertical run of belt A to deposit a second pasta ribbon on the topmost run 14 of belt A. Of course, two or more ribbons of fresh pasta may be individually pretreated in a separate tank of boiling water and then fed without the danger of sticking as a single multiple layer to a cooking system of the type shown in U.S. Pat. Nos. 4,522,217 or 2,905,105. While the walls of steam chamber 55 of FIG. 3 would ordinarily be insulated to curtail condensation thereon of the saturated steam injected into chamber 55 at a temperature of about 212° F., these walls may be externally heated to that temperature to prevent steam condensation thereon. In view of the many possible variations and modifications of the invention within the skill of the art, only such limitations should be imposed on the scope of the invention as are set forth in the appended claims.

We claim:

1. In the continuous cooking of a fresh pasta product in ribbon form by transportation through a cooking water bath along a zigzag travel path therein for a period of time sufficient to cook said pasta product, the improvement which comprises separately exposing at least two ribbons of said fresh pasta to saturated steam or hot water at a temperature above 180° F. for a brief period not exceeding about a minute and thereafter superimposing and capturing said ribbons between and in contact with two conveyor belts traveling through said cooking water bath along said zigzag travel path for simultaneous cooking of the superimposed ribbons whereby said ribbons are cooked without said ribbons sticking together.

2. The improvement of claim 1 wherein the brief period is not more than about 30 seconds.

3. The improvement of claim 1 wherein each ribbon of fresh pasta product is separately cooked in boiling water for a brief period of not more than about 30 seconds before superimposing the ribbons.

4. The improvement of claim 1 wherein each ribbon of fresh pasta product is separately exposed to saturated steam for a brief period of not more than about 30 seconds before superimposing the ribbons.

5. In the continuous cooking of a fresh pasta product in ribbon form by transportation through a cooking water bath along a zigzag travel path therein for a period of time sufficient to cook said pasta product, the improvement which comprises separately immersing at least two ribbons of said fresh pasta in boiling water for a brief period and thereafter superimposing and capturing said ribbons between and in contact with two conveyor belts traveling through said cooking water bath along said zigzag travel path for simultaneous cooking of the superimposed ribbons whereby said ribbons are cooked without said ribbons sticking together, said brief period being not more than 10% of the total cooking time.

6. The improvement of claim 5 wherein the brief period is in the range of about 5 to 7% of the total cooking time.

7. The improvement of claim 5 wherein the brief period is in the range of about 15 to 30 seconds.

* * * * *